United States Patent
Lyon

(10) Patent No.: US 9,596,419 B1
(45) Date of Patent: Mar. 14, 2017

(54) IMAGE CAPTURE SYSTEM WITH MOTION COMPENSATION

(71) Applicant: Google Inc., Mountain View, CA (US)

(72) Inventor: Richard Francis Lyon, Los Altos, CA (US)

(73) Assignee: Google Inc., Mountain View, CA (US)

( * ) Notice: Subject to any disclaimer, the term of this patent is extended or adjusted under 35 U.S.C. 154(b) by 20 days.

(21) Appl. No.: 14/832,335

(22) Filed: Aug. 21, 2015

(51) Int. Cl.
*H04N 5/228* (2006.01)
*H04N 5/353* (2011.01)
*H04N 5/374* (2011.01)

(52) U.S. Cl.
CPC ......... *H04N 5/3532* (2013.01); *H04N 5/3743* (2013.01)

(58) Field of Classification Search
CPC ........................... H04N 5/3532; H04N 5/3743
USPC ....................................................... 348/208.7
See application file for complete search history.

(56) References Cited

U.S. PATENT DOCUMENTS

| | | | |
|---|---|---|---|
| 1,953,304 | A | 4/1934 | Lutz |
| 2,899,882 | A | 8/1959 | Wylie et al. |
| 6,304,284 | B1 | 10/2001 | Dunton et al. |
| 6,351,288 | B1 | 2/2002 | Johnson et al. |

OTHER PUBLICATIONS

Andrew Wilson, "Shift/tilt lenses bring new perspectives", Vision Systems Design, May 1, 2006, Accessed on Jul. 8, 2015, <http://www.vision-systems.com/articles/print/volume-11/issue-5/features/product-focus/shift-tilt-lenses-bring-new-perspectives.html>.

*Primary Examiner* — Usman Khan
(74) *Attorney, Agent, or Firm* — Lerner, David, Littenberg, Krumholz & Mentlik, LLP

(57) ABSTRACT

An example image system may include a lens that produces an image, an image sensor, an image stabilizer, and a controller. This image sensor has a first edge and an opposite second edge. The first edge is placed closer to lens such that it focuses on more distant objects. The image stabilizer provides a time-varying compensation of image motion at the image sensor. The controller operates the image capture system in a repeating cycle where the sensor exposes and reads out an image progressively from one edge to the opposite edge. The controller operates the image stabilizer to provide an image motion compensation that varies in time such that the image motion compensation is greater when exposing and reading the second edge of the sensor than when exposing and reading the first edge of the sensor.

20 Claims, 9 Drawing Sheets

100

200

500A

700

900

IMAGE CAPTURE SYSTEM WITH MOTION COMPENSATION

BACKGROUND OF THE INVENTION

Defocus blur, motion blur, and noise due to short exposures at low light levels often limit cameras capturing images while in motion. In addition, cameras typically focus on a shallow range of depths.

BRIEF SUMMARY OF THE INVENTION

Aspects of the disclosure provide an image capture system. The image capture system includes a lens that produces an image; an image sensor having a first edge and a second edge opposite the first edge, the first edge being placed closer to lens such that the lens focuses on more distant objects; an image stabilizer configured to provide a time-varying compensation of image motion at the image sensor; and a controller configured to (1) operate the image capture system in a repeating cycle, wherein during each cycle the controller operates the sensor to expose and read out an image progressively from one edge to the opposite edge, and (2) operate the image stabilizer to provide an image motion compensation that varies in time such that the image motion compensation is greater when exposing and reading the second edge of the sensor than when exposing and reading the first edge of the sensor.

In one example, the image stabilizer includes an oscillation of the image capture system that is a rotational oscillation about an axis normal to a direction of the image motion. In this example, the rotational oscillation of the image capture system is about a vertical axis. Also in this example, the placement of the image sensor relative to the lens is unaffected by the oscillation of the image capture system.

In a further example, the controller is also configured to operate the image stabilizer to provide an amount of image motion compensation that compensates for the image motion for objects at a first distance when exposing and reading the first edge of the sensor and for objects at a second distance when exposing and reading the second edge of the sensor, the first distance being greater than the second distance. In this example, the controller is also configured to operate the image stabilizer to provide an amount of image motion compensation that compensates for the image motion for objects between the first and second distances when exposing and reading portions of the image sensor between the first and second edges.

In yet another example, the controller is also configured to process the composite image to extract textual information from objects in the composite image. In a further example, the image sensor is a rolling-shutter image sensor with rows oriented vertically and readout times progressing from back to front. In another example, the image stabilizer compensation comprises a rotational oscillation of the image sensor about an axis normal to a direction of the image motion. In this example, the oscillation of the one or more sensors includes a rotation of 10 degrees or less.

Other aspects of the disclosure provide a method. The method includes operating, using one or more controllers, an image capture system in a repeating cycle to capture a plurality of images, the image capture system having a lens, an image sensor, and an image stabilizer, wherein the image sensor has a first edge and a second edge opposite the first edge, the first edge being placed closer to lens such that it focuses on more distant objects; during each cycle, operating, using the one or more controllers, a sensor to expose and read out an image progressively from one edge to the opposite edge, and operating, using the one or more controllers, the image stabilizer to provide a time-varying image motion compensation such that the motion compensation is greater when exposing and reading the second edge of the sensor than when exposing and reading the first edge of the sensor.

In one example, the image stabilizer comprises an oscillation of the image capture system that is a rotational oscillation about an axis normal to a direction of the image motion. In this example, the rotational oscillation of the image capture system is about a vertical axis. Also in this example, the angle of the image sensor is fixed relative to the lens.

In another example, operating the image stabilizer to provide a time-varying image motion compensation also includes compensating for the image motion for objects at a first distance when exposing and reading the first edge of the sensor, for objects at a second distance when exposing and reading the second edge of the sensor, the first distance being greater than the second distance, and for objects between the first and second distances when exposing and reading portions of the image sensor between the first and second edges. In yet another example, the method also includes processing, by the one or more controllers, the plurality of images to extract textual information from objects in the images. In a further example, the image sensor is a rolling-shutter image sensor with rows oriented vertically and readout times progressing from back to front.

Further aspects of the disclosure provide a non-transitory, computer-readable medium on which instructions are stored, the instructions, when executed by one or more controllers, cause the one or more controllers to perform a method. The method includes operating an image capture system in a repeating cycle to capture a plurality of images, the image capture system having a lens, an image sensor, and an image stabilizer, wherein the image sensor has a first edge and a second edge opposite the first edge, the first edge being placed closer to lens such that it focuses on more distant objects; during each cycle, operating a sensor to expose and read out an image progressively from one edge to the opposite edge, and operating the image stabilizer to provide a time-varying image motion compensation such that the motion compensation is greater when exposing and reading the second edge of the sensor than when exposing and reading the first edge of the sensor.

In one example, operating the image stabilizer to provide a time-varying image motion compensation also includes compensating for the image motion for objects at a first distance when exposing and reading the first edge of the sensor, for objects at a second distance when exposing and reading the second edge of the sensor, the first distance being greater than the second distance, and for objects between the first and second distances when exposing and reading portions of the image sensor between the first and second edges. In another example, the method also includes processing the plurality of images to extract textual information from objects in the images.

DETAILED DESCRIPTION

Overview

Figure 1:
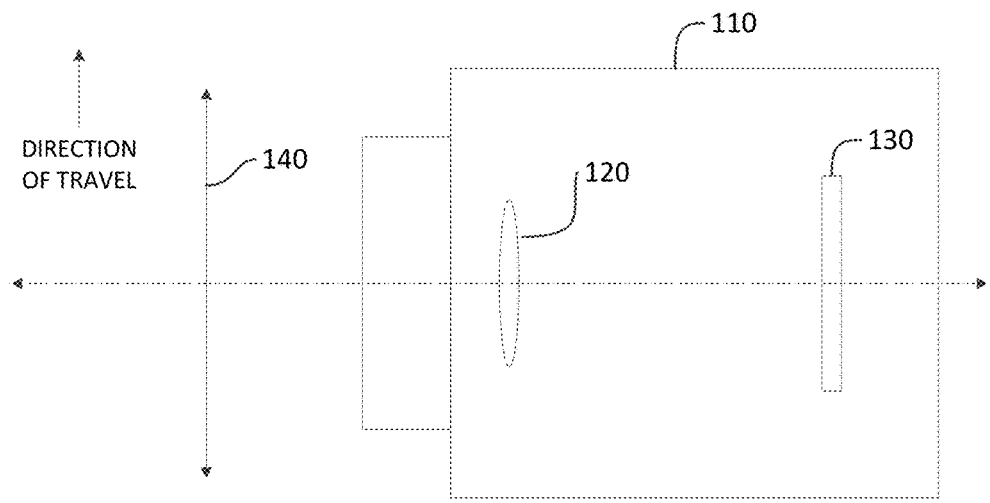
FIG. 1 is a functional diagram of an exemplary traditional image capture system according to aspects of the disclosure.

The technology relates to an image capture system that is able to capture images having a range of different distances in focus while the vehicle is in motion. The image capture system may be mounted or mountable on a vehicle.

Typical camera systems may utilize image sensors oriented parallel to a plane of a lens. In systems in which the image sensors are parallel to the lens, the distance at which objects are in focus is the same across the image sensor. These systems may utilize camera stabilizer systems, liquid wedge prism lenses, sensor shift, or post-processing adjustments in order to attempt to compensate for small movements and shakes due to a user's hand movement. However, when attempting to adapt for the movements of a vehicle these techniques have well-understood limits, making them less effective at addressing quality issues such as defocus blur, motion blur, and noise due to short exposures at low light levels. When such images are blurry or noisy, this may make it difficult to recognize certain features in images, such as text on signs, when using techniques such as optical character recognition (OCR). As a result, in order to capture the variety of shots required for OCR, typical camera systems may require either multiple passes or multiple cameras.

In order to improve the quality of images captured by the image capture system while the vehicle is in motion, an image capture system may utilize an image sensor installed on a tilt in relation to a lens rather than parallel to the lens. The image sensor in the image capture system may be tilted at an angle, with a first edge slightly closer to the lens, to focus best on distant objects, than a second edge opposite the first edge, which focuses best on near objects. The amount of tilt required to cover a range of object distances is approximately linear in reciprocal object distance: $i=f+f^2/o$, where image distance i (from image sensor to lens place) is slightly more than focal length f, by an amount proportional to the reciprocal of object distance o. As a result, the first edge of the image sensor may be focused on objects farther away from the camera than objects on which the second edge of the image sensor is focused, such that objects that appear in different positions in more than one image may be in better focus in one than in another.

The image sensor may be a rolling-shutter image sensor with rows oriented vertically, or in portrait mode, and readout times progressing from back to front, or vice versa. The rolling shutter reads out an image starting at one edge of the image sensor and progressing to the opposite edge, such that different portions of the image are read at slightly different times. By applying a time-varying image stabilization related to vehicle velocity, the motion blur due to vehicle motion may be compensated for objects at different distances in different portions of the image. Image stabilization may be applied by various known means, including moving the image sensor behind the lens, rotating the whole camera, or moving the image using a liquid-wedge prism.

The system may rotate on an axis normal to the direction in which the vehicle is traveling and normal to the direction in which the camera is pointing in order to compensate for vehicle movement; for example, a vertical axis if the camera is looking to the side of a moving car. The rotation may be a torsional oscillation and may also be sinusoidal or any other type of oscillation. In other words, the system may rotate back and forth on the axis, swinging the lens in the direction of travel and then opposite the direction of travel. During oscillation of the system, the orientation of the image sensor relative to the lens may remain fixed. When rotating opposite the direction of travel, the system may compensate for vehicle movement. This compensation may allow the system to capture clearer images of stationary objects that would otherwise be blurry due to the vehicle movement. Thus, to obtain the most images of higher quality, system may be set up to only capture images when the system is rotating opposite the direction of vehicle travel.

The combination of the tilted image sensor and rotating system may allow the system to compensate for varied angular velocities of multiple planes of focus. By nature of being a short distance away from a moving vehicle, objects close to the vehicle have a higher angular velocity than objects farther away from the vehicle. Objects at infinity have zero angular velocity. The angular velocity of an object changes in a linear fashion in relation to the reciprocal distance of the object from the system. When the tilted image sensor is rotated, the angular velocity of the first edge of the image sensor may be faster than the angular velocity of the second edge. This arrangement may compensate for the difference in angular velocity at different distances away from the vehicle and allow the system to capture portions of the image that are both well focused and well motion compensated for objects at different distances in different parts of the image.

To further compensate for the difference in angular velocity, the rotation of the system may be synchronized with a rolling shutter exposure and readout, and the amount of rotational velocity may be adjusted to be proportional to the vehicle velocity, such that the image motion on the image sensor is approximately stopped for objects that are in focus in each region of the image sensor.

The system may capture images at a high enough rate that objects of interest appear in several successive images, but are clearer or more in focus in one image or another depending on their distances and on their positions within the image. Because the tilted image sensor may provide a gradient of focal distances across a single image, neighboring images may capture the same object or location at different image locations having different best focus distances.

The captured images may be processed in order to extract textual information from objects in the image. Having been generated from images that have a variety of focus distances and have been compensated for motion as described above, traditional machine-reading methods may be applied.

Example Systems

FIG. 1 is a functional diagram of a traditional image capture system. Image capture system 110 may have lens 120 and an image sensor 130 arranged parallel to one another. As a result, the plane of focus 140 is also parallel to the lens.

Figure 2:
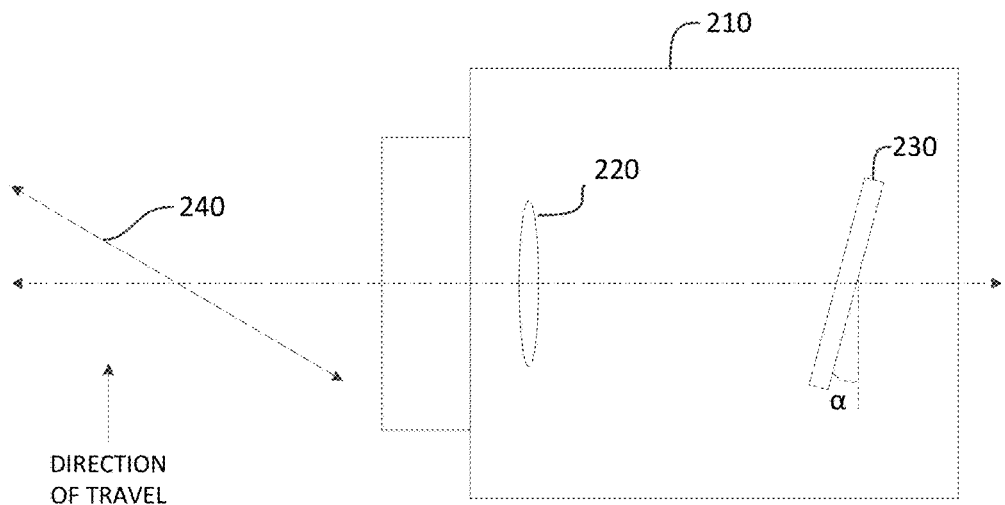
FIG. 2 is a functional diagram of an example image capture system according to aspects of the disclosure.

An image capture system may utilize an image sensor installed on a tilt in relation to a lens rather than parallel to the lens in order to improve the quality of images captured by the image capture system while the vehicle is in motion. As shown in FIG. 2, an image capture system 210 may have a lens 220 and image sensor 230. The image sensor 230 may be tilted at an angle α, with a first edge slightly closer to the lens, to focus best on distant objects, than a second edge opposite the first edge, which focuses best on near objects. The amount of tilt required to cover a range of object distances is approximately linear in reciprocal object distance: i=f+f²/o, where image distance i (from image sensor to lens place) is slightly more than focal length f, by an amount proportional to the reciprocal of object distance o.

For example, lens 220 may have a focal length 0.010 m (10 mm), with far distance of infinity, the near edge of the image sensor 230 may be placed 0.010 m behind the lens plane; with near object distance of 4 m, the opposite edge of the image sensor 230 may be placed 0.010025 m behind the lens plane. This slight tilt of 25 microns (0.000025 m) from one edge to the other corresponds to an angle of 2.5 milliradians (about 0.14 degree) if the image sensor edges are 10 mm apart. As a result, the first edge of the image sensor may be focused on objects farther away from the camera than objects on which the second edge of the image sensor 230 is focused, such that objects that appear in different positions in more than one image may be in better focus in one than in another.

The specific amount of tilt may be determined to be that which best covers the range of object distances to be imaged. As noted above, the direction of tilt may be about an axis normal to the direction in which the vehicle is traveling, such as a vertical axis, but may be in any other direction as well.

The image sensor 230 may be a rolling-shutter image sensor with rows oriented vertically, or in portrait mode, and readout times progressing from back to front, or vice versa. The rolling shutter reads out an image starting at one edge of the image sensor and progressing to the opposite edge, such that different portions of the image are read at slightly different times. The image may also be a collection of pixel photosensors in a single array on one chip or on a plurality of chips. Additionally or alternatively, the system may utilize a plurality of image sensors arranged on an angle behind the lens. An image sensor at a first edge of the lens may be a smaller distance from the lens than an image sensor at a second edge of the lens. Each of the plurality of image sensors may be tilted as described above. The plurality of image sensors may be configured to behave as a single rolling-shutter image sensor; in other words, expose and readout images starting at one edge of the lens and progressing to the opposite edge of the lens. Each image sensor may be a rolling-shutter image sensor, but not necessarily.

Figure 3:
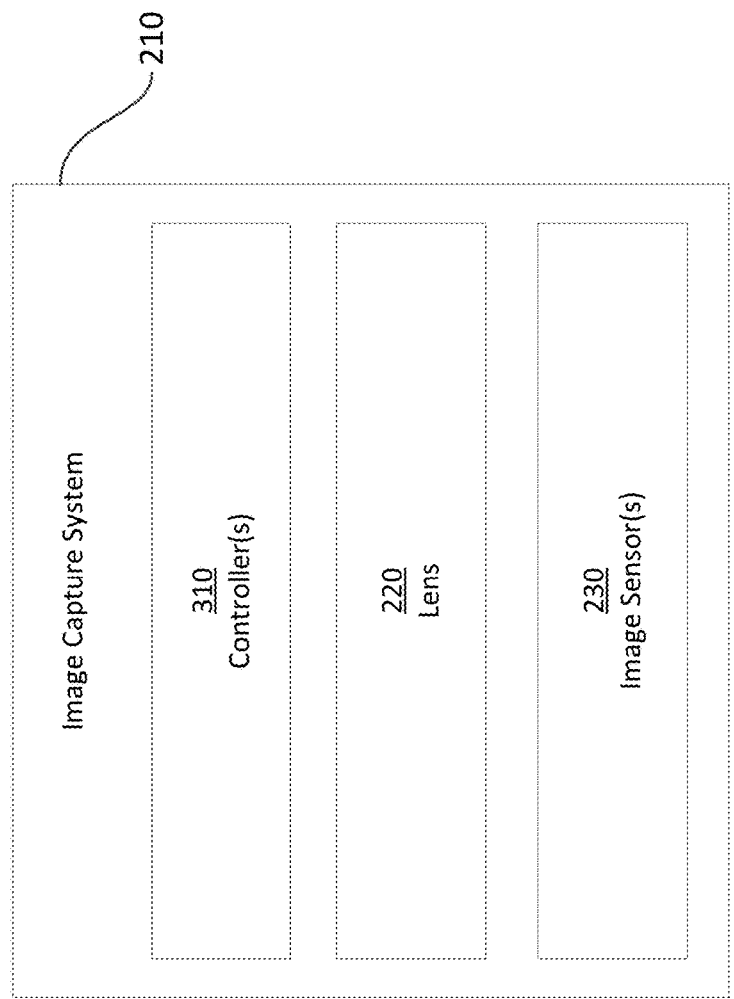
FIG. 3 is a pictorial diagram of the image capture system of FIG. 2 in accordance with aspects of the disclosure.

FIG. 3 is a pictorial diagram of the image capture system of FIG. 2. In addition to lens 220 and one or more image sensors 230, image capture system 210 may have one or more controllers 310. The one or more controllers 310 may control operations of the image capture system. For example, the one or more controllers 310 may cause the image capture system 210 to move or capture an image. The one or more controllers may also control components of the image capture system 210, such as lens 220 or image sensors 230, individually. In some examples, the image capture system may include a memory storing data and instructions that may be used executed to operate the system.

Figure 4:
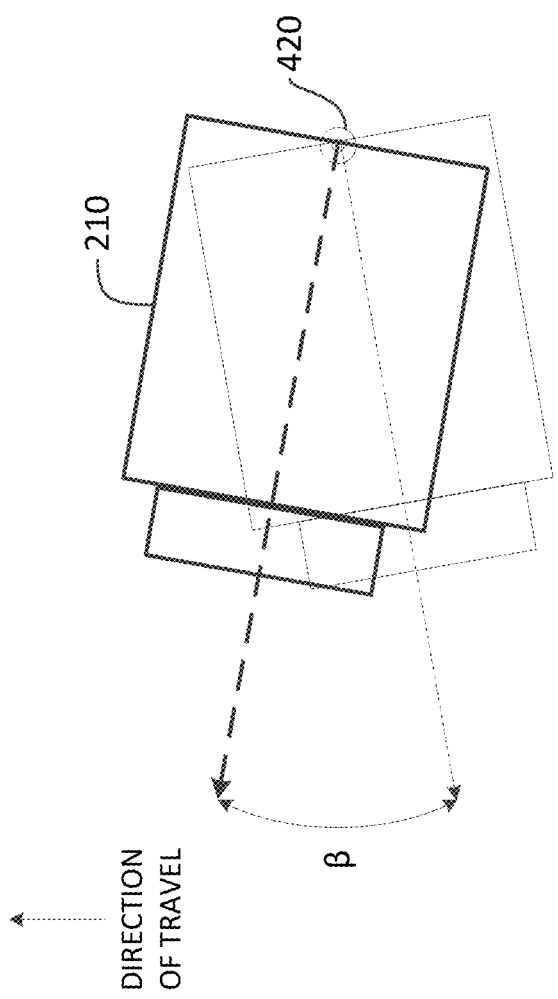
FIG. 4 is a functional diagram of an image capture system according to aspects of the disclosure.

In addition to having a tilted image sensor, the system may be configured to rotate on an axis normal to the direction in which the vehicle is traveling and normal to the direction in which the camera is pointing in order to compensate for vehicle movement. The rotation may be a torsional oscillation and may also be sinusoidal. In other words, the system may rotate back and forth on the axis, swinging the lens in the direction of travel and then opposite the direction of travel. As shown in FIG. 4, image capture system 210 may rotate back and forth about axis 420, covering angular distance β.

During oscillation of the system, the orientation of the image sensor relative to the lens may remain fixed. In other words, the image sensor may rotate together with the lens. For example, the system may rotate back and forth within 10 degrees of angular distance. The system may therefore compensate for displacement of the system in the period of time in which the system is rotating opposite the direction of travel. Put another way, the system may compensate for image motion across the sensor by rotating in the direction of image motion. The system may be configured to capture images when the system is rotating opposite the direction of displacement (or in the direction of image motion) and best compensating for the displacement.

Figure 5A:
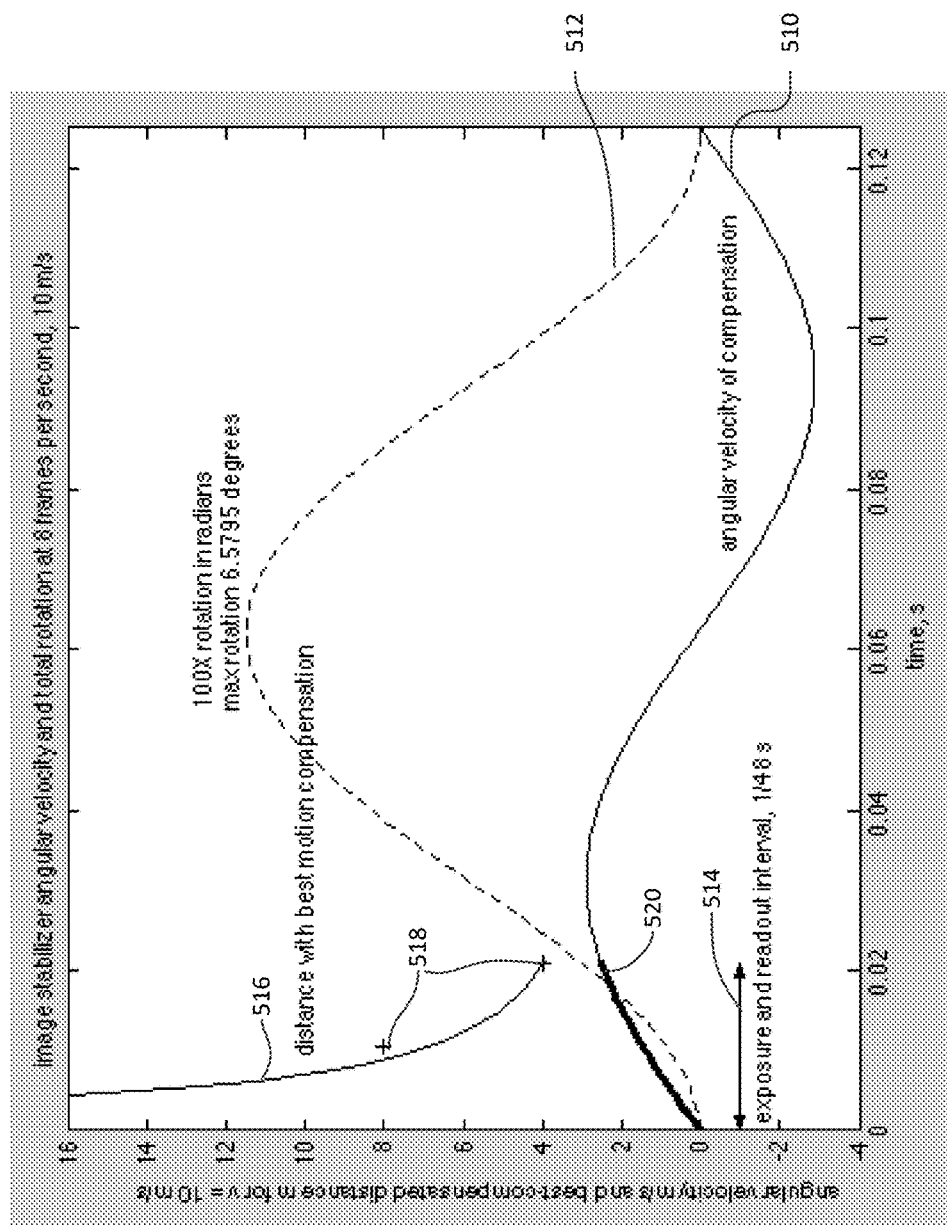
FIG. 5A is a graph representing an example operation of the image capture system according to aspects of the disclosure.
Figure 5B:
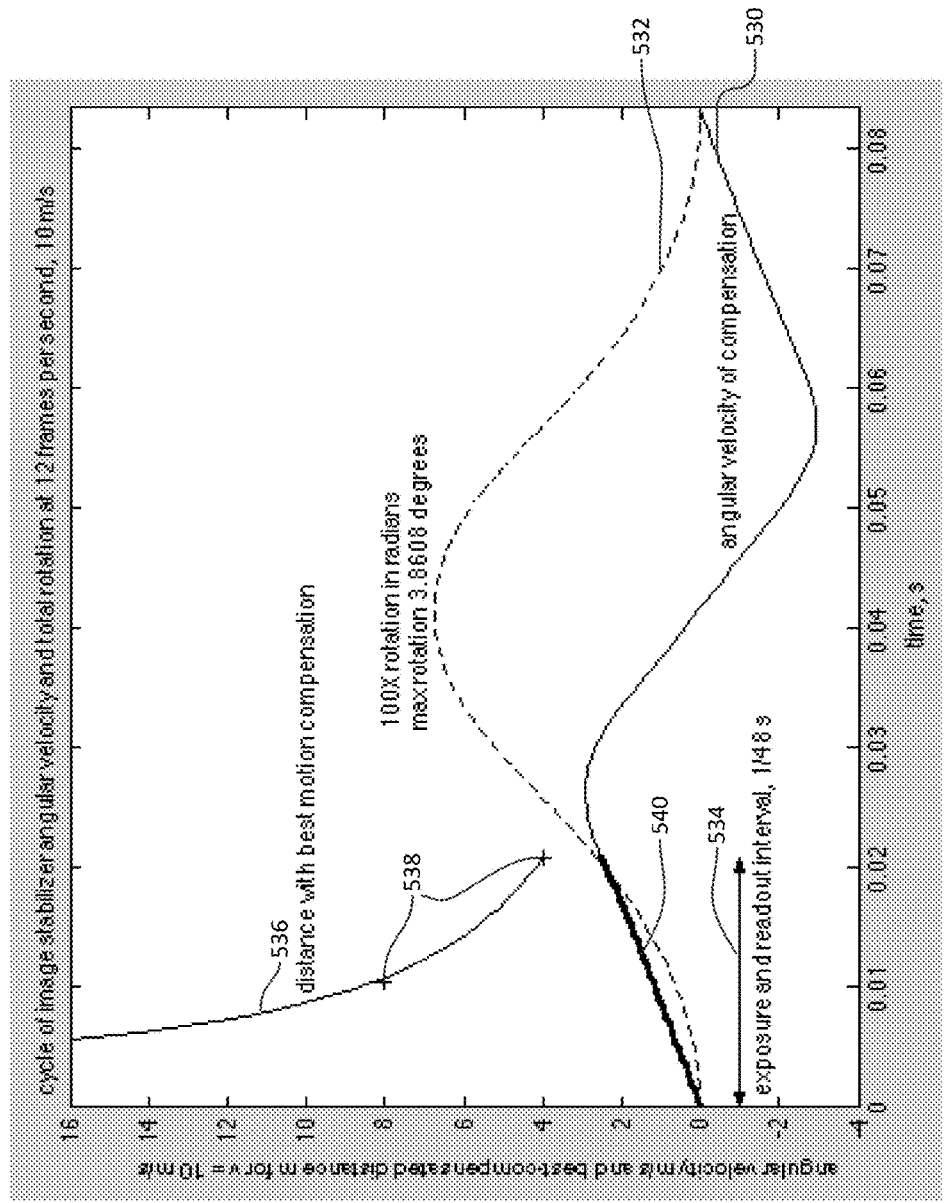
FIG. 5B is a graph representing an example operation of the image capture system according to aspects of the disclosure.

FIGS. 5A and 5B show the angular velocity and camera rotation angle versus time through a cycle of image capture for an image capture system calibrated to focus on object distances of 4 meters through infinity, according to example embodiments of the invention. FIG. 5A graphically depicts an example of the rotation of the image capture system as angular velocity over time shown in solid line 510. Dotted line 512 represents the amount of rotation in radians. Line 514 represents the exposure and readout interval for an image, and line segment 516 represents the distance with the best motion compensation based on the tilt of the image sensor and the angular velocity of the system. The + marks 518 represent the ideal angular velocity to compensate for velocity of travel at 4 meter and 8 meter distances. In FIG. 5A, the image capture rate is 8 frames per second (fps) with readout in ⅛s second, and vehicle velocity at 10 m/s. Therefore, at 8 fps, the system images during ⅙ of a sinusoidal motion, highlighted by the bold line 520, where the system rotation best compensates for distances ranging from 4 meters to infinity.

FIG. 5B graphically depicts another example of the rotation of the image capture system as angular velocity over time shown in solid line 530. Dotted line 532 represents the amount of rotation in radians. Line 534 represents the exposure and readout interval for an image, and line segment 536 represents the distance with the best motion compensation based on the tilt of the image sensor and the angular velocity of the system. The + marks 538 represent the ideal angular velocity to compensate for velocity of travel at 4 meter and 8 meter distances. In FIG. 5B, the image capture rate is 12 frames per second with readout in ⅛s second, and vehicle velocity at 10 m/s. The higher frame rate is obtained by using a motion closer to a sawtooth waveform (slower ramp one direction than the other, using up to fifth harmonic of the 12 Hz cycle). At a rate of 12 fps, the system images during ¼ of the cycle, as highlighted by bold line 540.

In addition to or as an alternative to rotation, the system may oscillate side-to-side as a translational oscillator in a plane parallel to the direction in which the vehicle is traveling. In yet another example, rather than rotating or oscillating the whole system, only the image sensor may be oscillated relative to the lens to compensate image motion.

The combination of the tilted image sensor and rotating system, may allow the system to compensate for varied angular velocities of multiple planes of focus. By nature of being a short distance away from a moving vehicle, objects close to the vehicle have a higher angular velocity than objects farther away from the vehicle. For example, for a vehicle velocity of 10 m/s, the angular velocity of an object at 4 meters away is 2.5 rad/s, or 2.5 mrad/ms. Objects at infinity have zero angular velocity. The angular velocity of an object changes in a linear fashion in relation to the reciprocal distance of the object from the system. When the tilted image sensor is rotated, the angular velocity of the first edge of the image sensor may be faster than the angular velocity of the second edge. In other words, the edge of the image sensor with the near focus may have the faster angular velocity. This arrangement may compensate for the difference in angular velocity at different distances away from the vehicle and allow the system to capture portions of the image that are both well focused and well motion compensated for objects at different distances in different parts of the image.

To further compensate for the difference in angular velocity, the rotation of the system may be synchronized with a rolling shutter exposure and readout, and the amount of rotational velocity may be adjusted to be proportional to the vehicle velocity, such that the image motion on the image sensor is approximately stopped for objects that are in focus in each region of the image sensor.

The system may capture images at a high enough rate that objects of interest appear in several successive images, but are clearer in one image or another depending on their distances and on their positions within the image. In other words, objects may appear in more than one image and at different points in different images. For example, the system may capture one shot per oscillation cycle, each oscillation being within 10 degrees of rotation. This ⅙ cycle exposure and readout may correspond to a frame interval equal to about 6 times the readout time, or ⅙ of the image sensor's maximum frame rate. For an image sensor capable of reading in ⅛s s, a total of 8 images may be captured per second, or an image every 1.25 meters if the vehicle is traveling at 10 m/s, which may capture multiple views of an object that is more than a few meters from the vehicle (depending on the field of view of the camera).

Because the tilted image sensor may provide a gradient of focal distances across a single image, neighboring images may capture the same object or location at different image locations having different best focus distances. For example, at object at 8 m distance might appear in 3 or more different images (depending on the field of view), and in at least one of those the object appear near the center of image where the best focus distance is 8 m (half way between the infinity and 4 m edges in terms of reciprocal distance). If the motion compensation is adjusted to no rotation at the infinity edge and compensation for 10 m/s vehicle motion for objects at 4 m distance (rotation of 2.5 radians per second) at the other edge, and varying approximately linearly between those, then it will approximately cancel the motion blur for the object at 8 m distance near the center of the image. Similarly, other objects at distances between 4 m and infinity will be both well focus and motion compensated at the approximately corresponding image locations, so that if they appear in several image they will be sharp in at least one.

Figure 6:
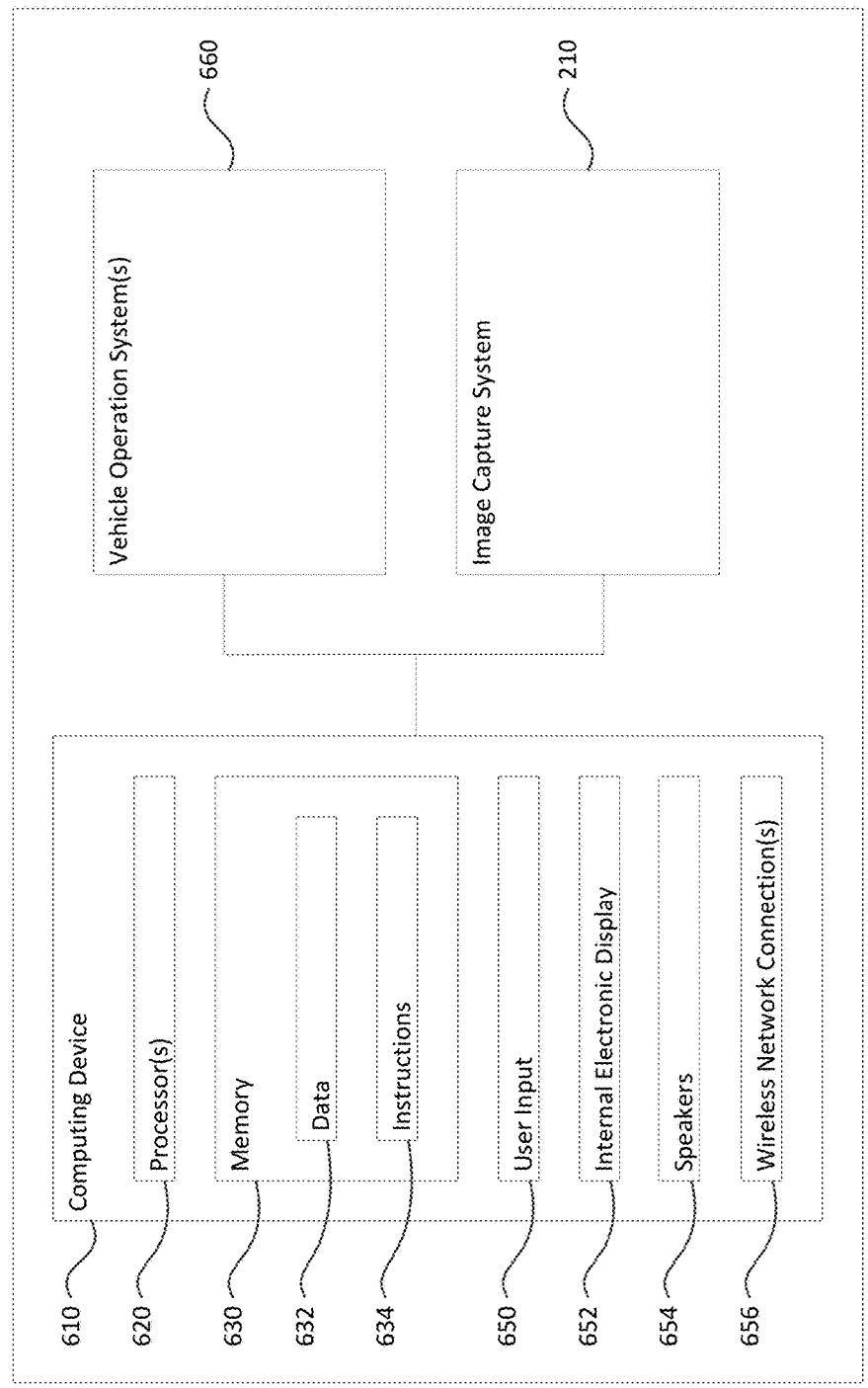
FIG. 6 is a functional diagram of an example system in accordance with an exemplary embodiment.

As shown in FIG. 6, image capture system 210 may be incorporated into vehicle 600. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 610 containing one or more processors 620, memory 630 and other components typically present in general purpose computing devices. Image capture system 210 may be connected to computing device 610 and mounted onto vehicle 600.

The memory 630 stores information accessible by the one or more processors 620, including data 632 and instructions 634 that may be executed or otherwise used by the processor 620. The one or more processors 620 may be any conventional processors, such as commercially available CPUs. Alternatively, the one or more processors may be a dedicated device such as an ASIC or other hardware-based processor. The memory 630 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 632 may be retrieved, stored or modified by processor 620 in accordance with the instructions 634. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 634 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

Although FIG. 6 functionally illustrates the processor, memory, and other elements of computing device 610 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 610. Accordingly, references to a processor or computing device will be understood to include references to a collection of processors or computing devices or memories that may or may not operate in parallel.

Computing device 610 may have all of the components normally used in connection with a computing device such as the processor and memory described above as well as a user input 650 (e.g., a mouse, keyboard, touch screen and/or microphone) and various electronic displays (e.g., a monitor having a screen or any other electrical device that is operable to display information). In this example, the vehicle includes an internal electronic display 652 as well as one or more speakers 654 to provide information or audio visual experiences. In this regard, internal electronic display 652 may be located within a cabin of vehicle 600 and may be used by computing device 610 to provide information to passengers within the vehicle 600.

Computing device 610 may also include one or more wireless network connections 654 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In addition to image capture system 210, computing device 610 may also be in communication with one or more vehicle operation systems 660 of vehicle 600. Vehicle operation systems 660 may include systems involved in operations of the vehicle, such as one or more of deceleration, acceleration, steering, signaling, navigation, positioning, detection, etc. Although one or more vehicle operation systems 660 are shown as external to computing device 610, in actuality, the systems may also be incorporated into computing device 610.

Figure 7:
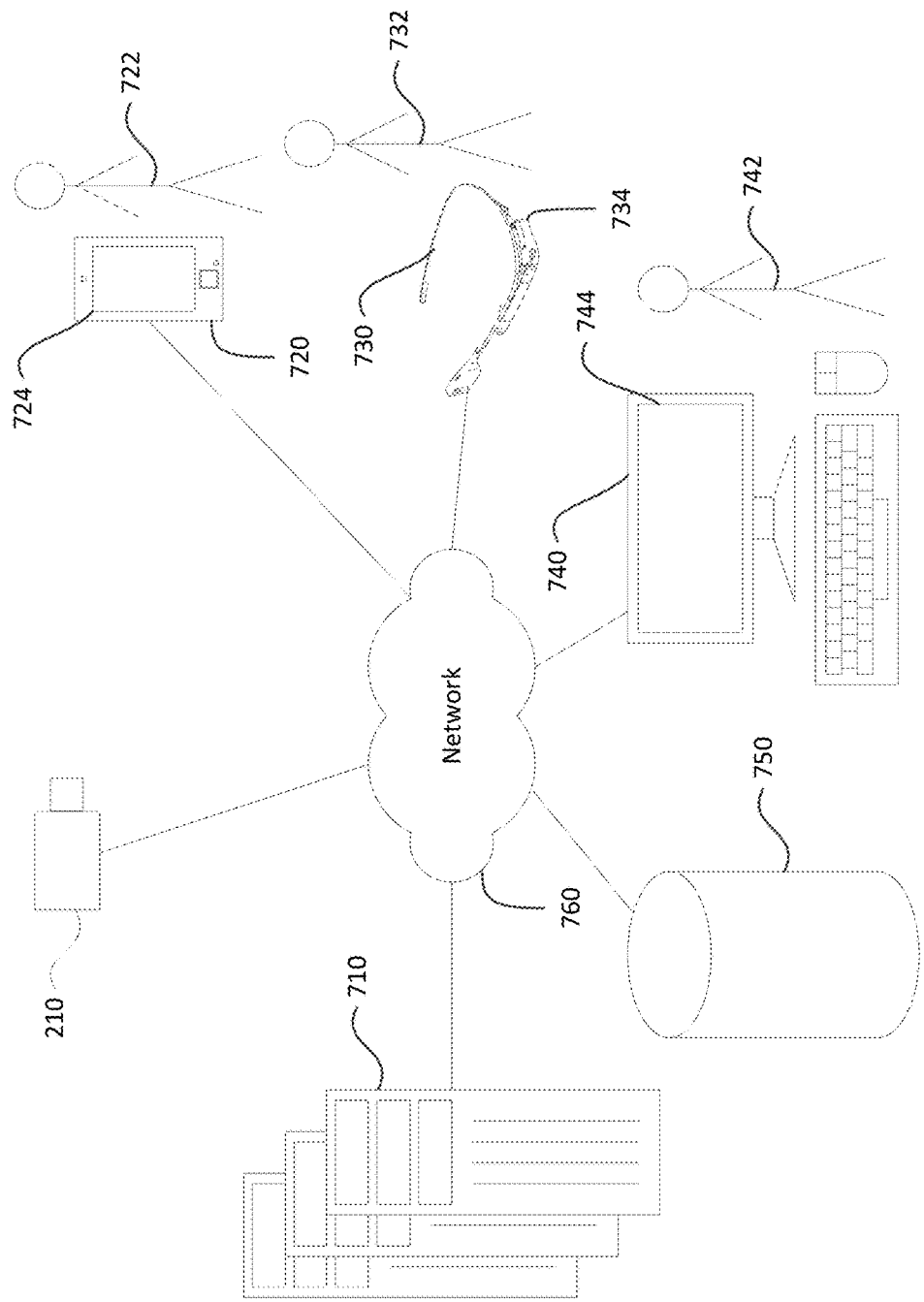
FIG. 7 is a functional diagram of an example system in accordance with an exemplary embodiment.
Figure 8:
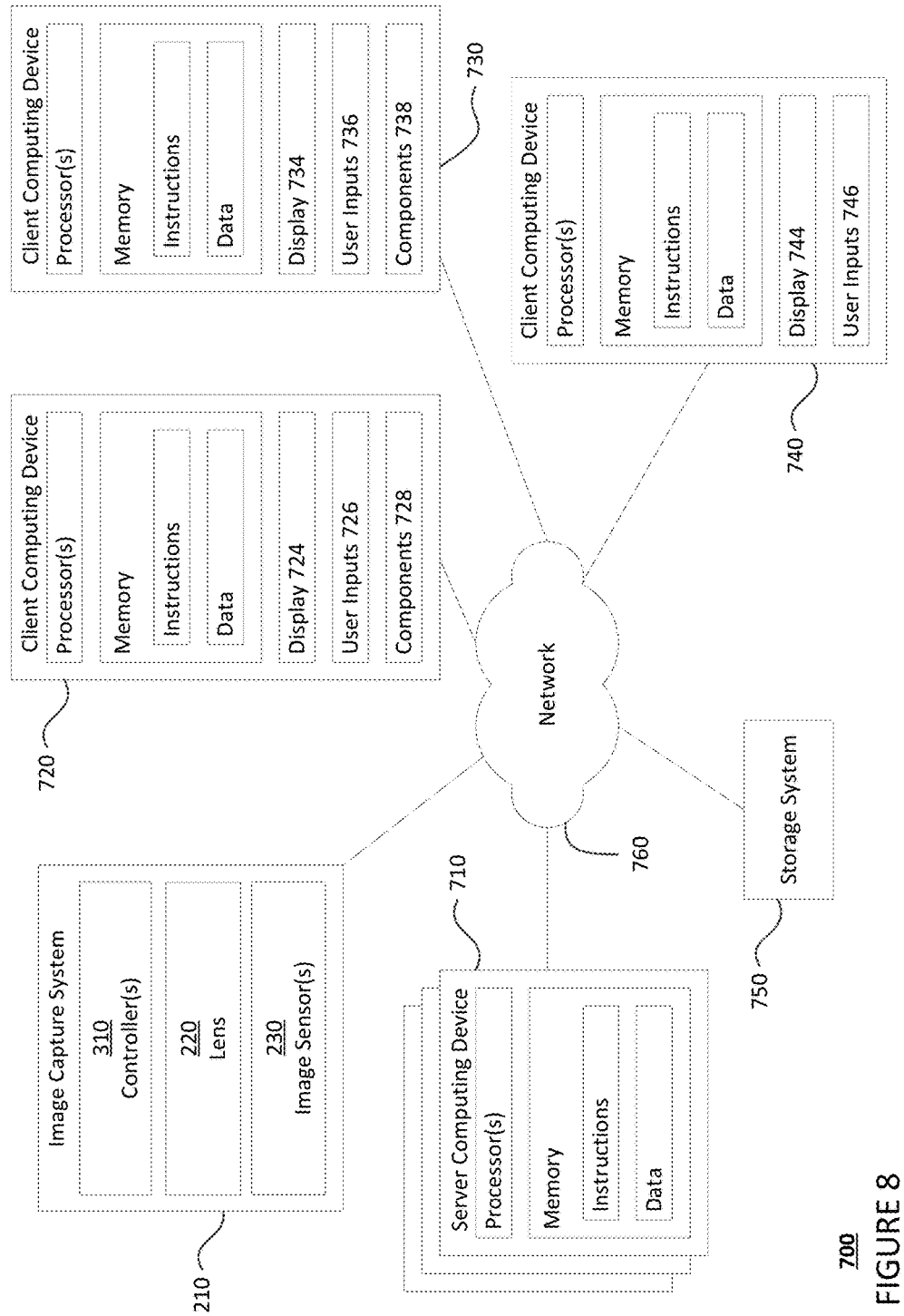
FIG. 8 is a pictorial diagram of the system of FIG. 2 in accordance with aspects of the disclosure.

Image capture system 210 may also receive or transfer information, such as captured images, to and from other computing devices. FIGS. 7 and 8 are pictorial and functional diagrams, respectively, of an example system 700 that includes a plurality of computing devices 710, 720, 730, 740 and a storage system 750 connected via a network 760. System 700 also includes image capture system 210. Although only a few computing devices are depicted for simplicity, a typical system may include significantly more. Additionally or alternatively, one or more vehicles such as vehicle 600 may be included in system 700.

As shown in FIG. 8, each of computing devices 710, 720, 730, 740 may include one or more processors, memory, data and instructions. Such processors, memories, data and instructions may be configured similarly to one or more processors 620, memory 630, data 632, and instructions 634 of computing device 610.

The network 760, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In addition, server computing devices 710 may use network 760 to transmit and present information to a user, such as user 722, 732, 742 on a display, such as displays 724, 734, 742 of computing devices 720, 730, 740. In this regard, computing devices 720, 730, 740 may be considered client computing devices.

As shown in FIG. 8, each client computing device 720, 730, 740 may be a personal computing device intended for use by a user 722, 732, 742, and have all of the components normally used in connection with a personal computing device including a one or more processors (e.g., a central processing unit (CPU)), memory (e.g., RAM and internal hard drives) storing data and instructions, a display such as displays 724, 734, 744 (e.g., a monitor having a screen, a touch-screen, a projector, a television, or other device that is operable to display information), and user input devices 726, 736, 746 (e.g., a mouse, keyboard, touch screen or microphone). The client computing devices may also include a camera for recording video streams, speakers, a network interface device, and all of the components used for connecting these elements to one another.

In addition, the client computing devices 720 and 730 may also include components 728 and 738 for determining the position and orientation of client computing devices. For example, these components may include a GPS receiver to determine the device's latitude, longitude and/or altitude as well as an accelerometer, gyroscope or another direction/speed detection device.

Although the client computing devices 720, 730, and 740 may each comprise a full-sized personal computing device, they may alternatively comprise mobile computing devices capable of wirelessly exchanging data with a server over a network such as the Internet. By way of example only, client computing device 720 may be a mobile phone or a device such as a wireless-enabled PDA, a tablet PC, a wearable computing device or system, or a netbook that is capable of obtaining information via the Internet or other networks. In another example, client computing device 730 may be a wearable computing system, shown as a head-mounted computing system in FIG. 7. As an example the user may input information using a small keyboard, a keypad, microphone, using visual signals with a camera, or a touch screen.

Storage system 750 may store various types of information that may be retrieved or otherwise accessed by a server computing device, such as one or more server computing devices 710, in order to perform some or all of the features described herein. The storage system 750 may store images captured by image capture system 210. Information associated with images such as location information and pose information may be stored in association with the images.

As with memory 730, storage system 750 can be of any type of computerized storage capable of storing information accessible by the server computing devices 710, such as a hard-drive, memory card, ROM, RAM, DVD, CD-ROM, write-capable, and read-only memories. In addition, storage system 750 may include a distributed storage system where data is stored on a plurality of different storage devices which may be physically located at the same or different geographic locations. Storage system 750 may be connected to the computing devices via the network 760 as shown in FIG. 7 and/or may be directly connected to or incorporated into any of the computing devices 710, 720, 730, 740, image capture device 210, etc.

Example Methods

Figure 9:
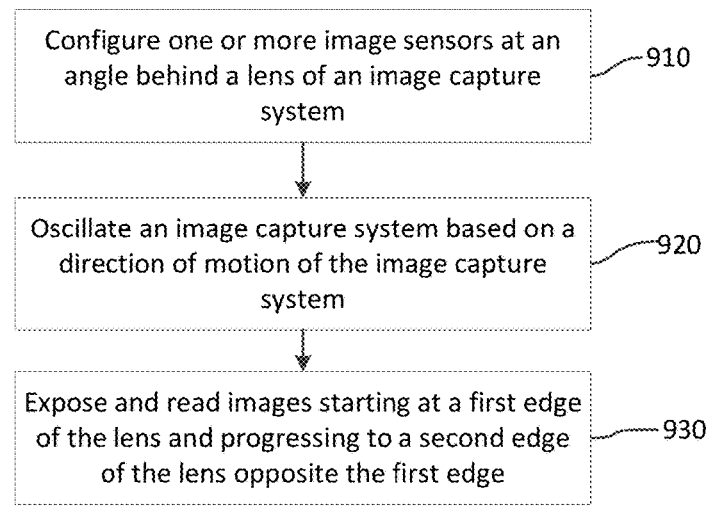
FIG. 9 is a flow diagram of an example method according to aspects of the disclosure.

FIG. 9 is an example flow diagram 900 in accordance with some of the aspects described above that may be performed by one or more controllers in the system. In this example, one or more image sensors may be configured at an angle behind a lens of an image capture system at block 910. The image capture system may then be oscillated based on a direction of motion of the image capture system at block 920. For example, the image capture system may be mounted on a vehicle, in which case, the direction the vehicle is traveling would be the direction of motion of the image capture system. At block 930, the image capture system may expose and read images starting at a first edge of a lens in the system and progressing to a second edge of the lens opposite the first edge. To expose and read images in such a way, a sensor of the image capture system may be a rolling-shutter image sensor.

The captured images may be processed in order to extract textual information from objects in the image. Having been generated from images that have a variety of focus distances and have been compensated for motion as described above, traditional machine-reading methods may be applied. For example, words on signs may be read through use of OCR. The captured images may be processed at the image capture device 210. In other examples, the captured images may be sent via network 760 to one or more computing devices 710, 720, 730, 740 and processed at the one or more computing devices. The captured images and/or the extracted information may be sent from image capture system 210 or one or more computing devices 710, 720, 730, 740 via the network 760 to storage system 750. In response to a user request, a captured image or extracted information may be retrieved from storage system 750.

In some examples, a composite image may be generated by stitching together select portions of the captured images that are most in focus and processed in order to extract information from the image. The composite image may be a panoramic image. In order to select the portions of the captured images that are most in focus, portions of different images capturing a particular location may be compared. The portion of a captured image that depicts a particular location the clearest or at a location closest to the focal distance may be selected to be included in the composite image. The system may use LIDAR to detect the distance between the particular location and the vehicle. The portion of a captured image in which the particular location is captured at the image sensor portion focused on a distance matching the detected distance may be selected to be included in the composite image. The generated composite image may then be processed to extract textual information from objects in the image.

The features described above allow for the capture of images that are in focus at a wide range of distances when traveling at a high velocity, such as when driving in a car. While each of a tilted image sensor, rotation or oscillation, or overlapping images provides individual advantages over a typical image capture system as discussed above, the combination of these may provide the best source of captured images for generating composite images as described above. As a result, the composite images may contain more information than what is typically captured in an image taken from a moving vehicle. For example, the composite images may be used in post-processing to extract textual information like words on signs that would otherwise be too blurry or out-of-focus to read if captured by a typical image capture system. In addition, the tilted image sensor and the motion of the image sensor allows for the efficient capture of images in a single pass with one camera where the images are captured at a variety of focus distances and degrees of motion compensation. As such, the features disclosed above may allow for the use of wider aperture and slower shutter speeds, enabling the image capture system to get enough light to make clean images at a high velocity.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An image capture system comprising:
a lens that produces an image;
an image sensor having a first edge and a second edge opposite the first edge, the first edge being placed closer to lens such that the lens focuses on more distant objects;
an image stabilizer configured to provide a time-varying compensation of image motion at the image sensor; and
a controller configured to:
operate the image capture system in a repeating cycle, wherein during each cycle the controller operates the sensor to expose and read out an image progressively from one edge to the opposite edge, and
operate the image stabilizer to provide an image motion compensation that varies in time such that the image motion compensation is greater when exposing and reading the second edge of the sensor than when exposing and reading the first edge of the sensor.

2. The system of claim 1, wherein the image stabilizer comprises an oscillation of the image capture system that is a rotational oscillation about an axis normal to a direction of the image motion.

3. The system of claim 2, wherein the rotational oscillation of the image capture system is about a vertical axis.

4. The system of claim 1, wherein the controller is further configured to operate the image stabilizer to provide an amount of image motion compensation that compensates for the image motion for objects at a first distance when exposing and reading the first edge of the sensor and for objects at a second distance when exposing and reading the second edge of the sensor, the first distance being greater than the second distance.

5. The system of claim 4, wherein the controller is further configured to operate the image stabilizer to provide an amount of image motion compensation that compensates for the image motion for objects between the first and second distances when exposing and reading portions of the image sensor between the first and second edges.

6. The system of claim 1, wherein the controller is further configured to process the composite image to extract textual information from objects in the composite image.

7. The system of claim 1, wherein the image sensor is a rolling-shutter image sensor with rows oriented vertically and readout times progressing from back to front.

8. The system of claim 2, wherein the placement of the image sensor relative to the lens is unaffected by the oscillation of the image capture system.

9. The system of claim 1, wherein the image stabilizer compensation comprises a rotational oscillation of the image sensor about an axis normal to a direction of the image motion.

10. The system of claim 9, wherein the oscillation of the one or more sensors includes a rotation of 10 degrees or less.

11. A method comprising:
operating, using one or more controllers, an image capture system in a repeating cycle to capture a plurality of images, the image capture system having a lens, an image sensor, and an image stabilizer, wherein the image sensor has a first edge and a second edge opposite the first edge, the first edge being placed closer to lens such that it focuses on more distant objects;

during each cycle, operating, using the one or more controllers, a sensor to expose and read out an image progressively from one edge to the opposite edge, and operating, using the one or more controllers, the image stabilizer to provide a time-varying image motion compensation such that the motion compensation is greater when exposing and reading the second edge of the sensor than when exposing and reading the first edge of the sensor.

12. The method of claim 11, wherein the image stabilizer comprises an oscillation of the image capture system that is a rotational oscillation about an axis normal to a direction of the image motion.

13. The method of claim 12, wherein the rotational oscillation of the image capture system is about a vertical axis.

14. The method of claim 11, wherein operating the image stabilizer to provide a time-varying image motion compensation further comprises compensating for the image motion for objects at a first distance when exposing and reading the first edge of the sensor, for objects at a second distance when exposing and reading the second edge of the sensor, the first distance being greater than the second distance, and for objects between the first and second distances when exposing and reading portions of the image sensor between the first and second edges.

15. The method of claim 11, further comprising processing, by the one or more controllers, the plurality of images to extract textual information from objects in the images.

16. The method of claim 11, wherein the image sensor is a rolling-shutter image sensor with rows oriented vertically and readout times progressing from back to front.

17. The method of claim 12, wherein the angle of the image sensor is fixed relative to the lens.

18. A non-transitory, computer-readable medium on which instructions are stored, the instructions, when executed by one or more controllers, cause the one or more controllers to perform a method, the method comprising:

operating an image capture system in a repeating cycle to capture a plurality of images, the image capture system having a lens, an image sensor, and an image stabilizer, wherein the image sensor has a first edge and a second edge opposite the first edge, the first edge being placed closer to lens such that it focuses on more distant objects;

during each cycle a sensor to expose and read out an image progressively from one edge to the opposite edge, and operating the image stabilizer to provide a time-varying image motion compensation such that the motion compensation is greater when exposing and reading the second edge of the sensor than when exposing and reading the first edge of the sensor.

19. The medium of claim 18, wherein operating the image stabilizer to provide a time-varying image motion compensation further comprises compensating for the image motion for objects at a first distance when exposing and reading the first edge of the sensor, for objects at a second distance when exposing and reading the second edge of the sensor, the first distance being greater than the second distance, and for objects between the first and second distances when exposing and reading portions of the image sensor between the first and second edges.

20. The medium of claim 18, wherein the method further comprises processing the plurality of images to extract textual information from objects in the images.

* * * * *